G. A. SAWIN.
ELECTRIC METER.
APPLICATION FILED SEPT. 13, 1906.

974,192.

Patented Nov. 1, 1910.

2 SHEETS—SHEET 1.

Witnesses:

Inventor:
George A. Sawin,
by ........ Atty

UNITED STATES PATENT OFFICE.

GEORGE A. SAWIN, OF LYNN, MASSACHUSETTS, ASSIGNOR TO GENERAL ELECTRIC COMPANY, A CORPORATION OF NEW YORK.

ELECTRIC METER.

974,192.    Specification of Letters Patent.    Patented Nov. 1, 1910.

Application filed September 13, 1906. Serial No. 334,433.

*To all whom it may concern:*

Be it known that I, GEORGE A. SAWIN, a citizen of the United States, residing at Lynn, county of Essex, State of Massachusetts, have invented certain new and useful Improvements in Electric Meters, of which the following is a specification.

My invention relates to electric meters, and has for its object to provide an arrangement for reducing wear on the jewel bearings and for eliminating creeping.

As is well known, wear of the jewels is increased by vibration due to external causes while there is no load on the meter, and also, in induction meters, by the vibration of the disk due to the field of the potential coil.

My invention in its broader aspects consists of providing means operative upon the cessation of current flow through the current coils of the meter for restraining the movable element of the motor from movement. I accomplish this by providing the magnet winding in series with the coils of the motor with means controlled by the magnet for frictionally braking the movable element of the meter. One convenient method of accomplishing this result is to separate the shaft and thrust bearing, either by lifting the shaft or by lowering the jewel away from the shaft.

Another feature of my invention consists in providing means for breaking the circuit of the potential coils of the meter, when no current is flowing from the current coils. This results in a saving of energy, and in induction meters, prevents any tendency to vibration except that due to outside the meter.

My invention will be best understood by reference to the accompanying drawings, in which—

Figure 1:
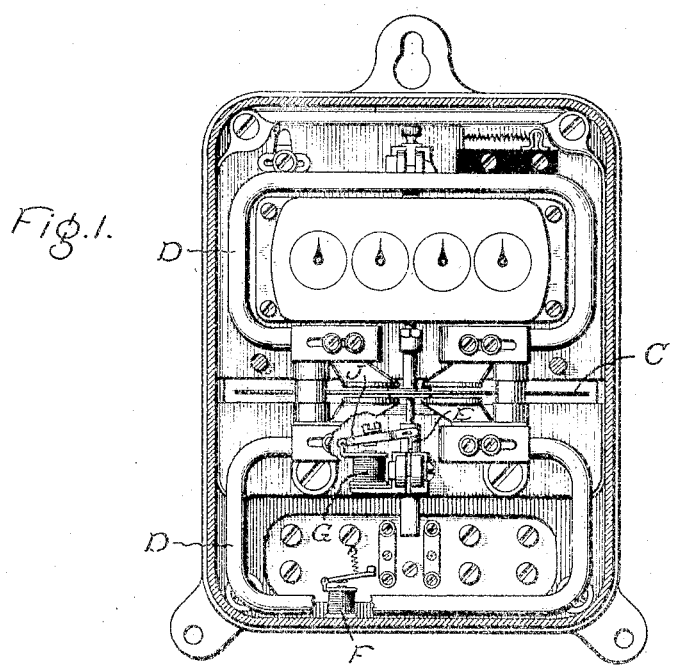
Figure 2:
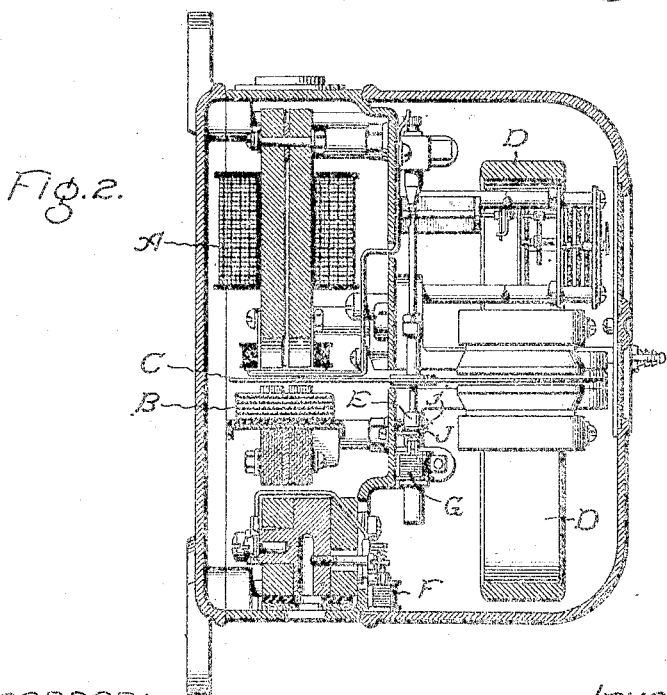
Figure 3:
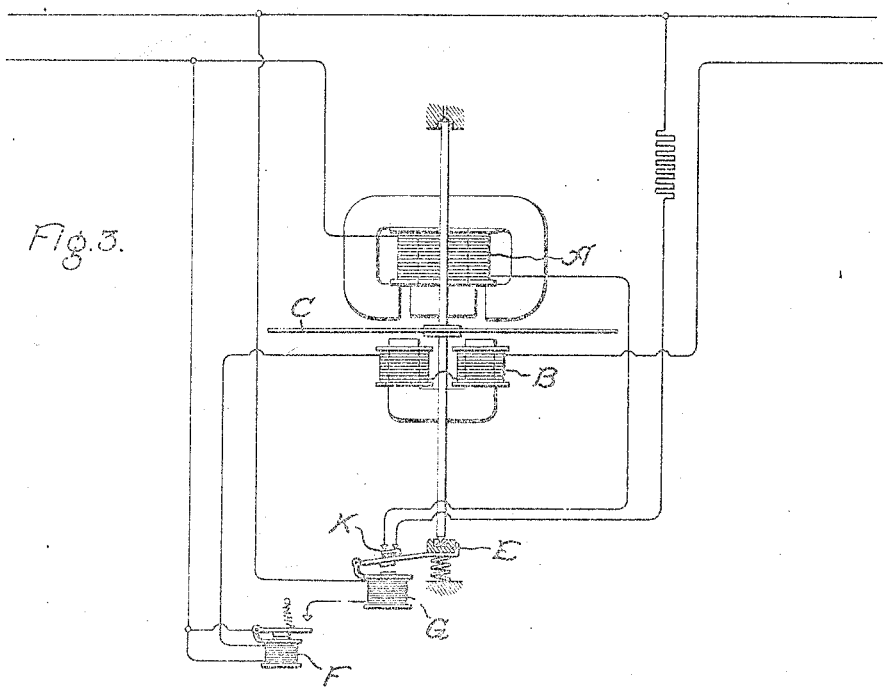
Figure 4:
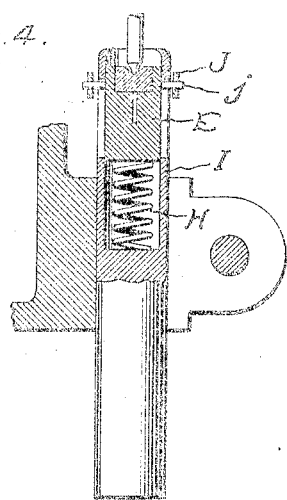
Figure 5:
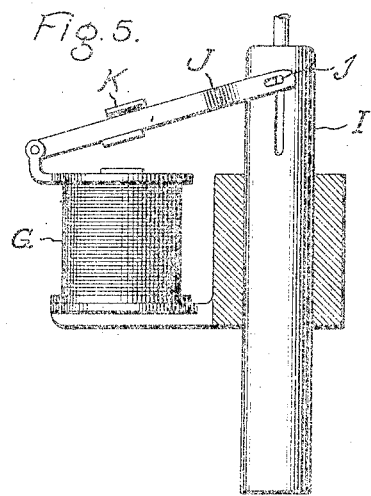

Figure 1 shows a front elevation of a meter arranged in accordance with my invention; Fig. 2 shows a side elevation of the same, partly in cross section; Fig. 3 is a diagram of connections; and Figs. 4 and 5 show details of construction.

In the drawings A represents the potential coil and B the current coils of the meter which acting inductively on the disk produces rotation of the disk in the well known manner. D represents the damping magnets. The disk is shown with a vertical shaft pivoted with the thrust bearing E. F represents a magnet coil in series with the current coils B, controlling a second magnet coil G. As long as current is flowing through coils B, that is as long as there is any load on the circuit of the meter, the magnet coil F holds its armature retracted, thereby opening the circuit of magnet G. Whenever no current is flowing through the coils B, the magnet F releases its armature, thereby closing the circuit of coil G. The coil G operates to brake the disk frictionally by withdrawing the thrust bearing E, so as to allow the disk C to drop on the motor elements of the meter, the damping magnets, or other support. A suitable arrangement of the thrust bearing for permitting this operation is shown in Figs. 4 and 5. The armature of magnet G is carried by a pivoted member J, the end of which is forked shaped, and engages pins j, which extend through slots in the tube I, and are secured to the bearing E, which is vertically movable in the tube I, and is normally held raised by the compression spring H. Whenever the magnet G is energized, it draws down its armature, pulling the member J downward, which lowers the bearing E away from the shaft and compresses spring H. The spring returns the bearing into engagement with the shaft whenever the circuit of magnet G is broken. With this construction, wear of the jewel due to vibration of the disk when not running is avoided, and creeping is also prevented. The magnet G may further be employed to break the circuit of the potential coil by providing its armature with a contact K, in series with the potential coil A, as shown in Fig. 3. By employing this contact, energy is saved which would otherwise be wasted in the potential coil, and also the tendency to vibration due to the field of the potential coil is removed.

It will be understood that while I have described a preferred embodiment of my invention, my invention may be embodied in many forms without departing from its spirit, and I aim in the appended claims to cover all such embodiments as will be obvious to those skilled in the art.

What I claim as new and desire to secure by Letters Patent of the United States, is,—

1. In an electric meter having a vertical shaft, a thrust bearing therefor and current coils, the combination with the vertical shaft and the thrust bearing, of means operative upon a cessation of current-flow through the current coils of the meter for separating the shaft and its bearing.

2. In an electric meter having a vertical shaft, a thrust bearing therefor and current coils, the combination with the vertical shaft and the thrust bearing, of means operative upon the cessation of current-flow through the current coils of said meter for lowering said bearing away from the shaft.

3. In an electric meter having current coils, a vertical shaft and thrust bearing therefor, a magnet coil in series with the current coils of the meter, and means controlled thereby for separating the shaft and its bearing.

4. In an electric meter having current coils, a vertical shaft and a thrust bearing therefor, a magnet coil in series with the current coils of the meter, and means controlled thereby for lowering said bearing away from the shaft.

5. In an electric meter having current coils, a potential coil, and a movable element, the combination with the current coils of means controlled by the current flow through the current coils for opening the circuit of the potential coil and for causing the movable element of the meter to be frictionally braked.

6. In an electric meter having current coils, a potential coil, and a movable element, a magnet coil in series with the current coils of the meter, and means controlled thereby for opening the circuit of the potential coil and for causing the movable element of the meter to be frictionally braked.

7. In an electric meter having current coils, a potential coil, a vertical shaft, and a thrust bearing therefor, a magnet coil in series with the current coils of the meter, a second coil, means in operative relation with the first coil for energizing the winding of the second coil, and means in operative relation with the second coil for lowering the bearing away from the shaft and for opening the circuit of the potential coil.

In witness whereof, I have hereunto set my hand this tenth day of September, 1906.

GEORGE A. SAWIN.

Witnesses:
JOHN A. McMANUS, Jr.,
HENRY O. WESTENDARP.